United States Patent [19]

Herron

[11] 4,163,456

[45] Aug. 7, 1979

[54] AIR RELEASE VALVE

[76] Inventor: Keith R. Herron, 15 Blackburn St., Moorooka, Queensland 4105, Australia

[21] Appl. No.: 832,471

[22] Filed: Sep. 12, 1977

[51] Int. Cl.² .......................................... F16K 31/22
[52] U.S. Cl. .................................. 137/202; 137/433
[58] Field of Search .............................. 137/202, 433

[56] References Cited

U.S. PATENT DOCUMENTS

| 2,931,337 | 4/1960 | Nations | 137/202 |
| 4,011,884 | 3/1977 | Drori | 137/202 |

Primary Examiner—Alan Cohan
Attorney, Agent, or Firm—Donald D. Jeffery

[57] ABSTRACT

An air release valve, used in a system containing liquid with gas above it, has a float chamber connected to the system and containing a float which normally closes a primary orifice leading through a vertically movable spring-loaded piston to an upper chamber. When the piston is raised by gas pressure in the float chamber to open the primary orifice, a seal pad, spring-mounted above the piston, closes a secondary orifice from the top chamber to atmosphere until the increased pressure in the top chamber moves the piston down to open the secondary orifice. When liquid entering the float chamber causes the float to rise, closing the primary orifice and lifting the piston, the seal pad closes the secondary orifice, trapped gas lowers the liquid and float, and the primary orifice opens.

4 Claims, 1 Drawing Figure

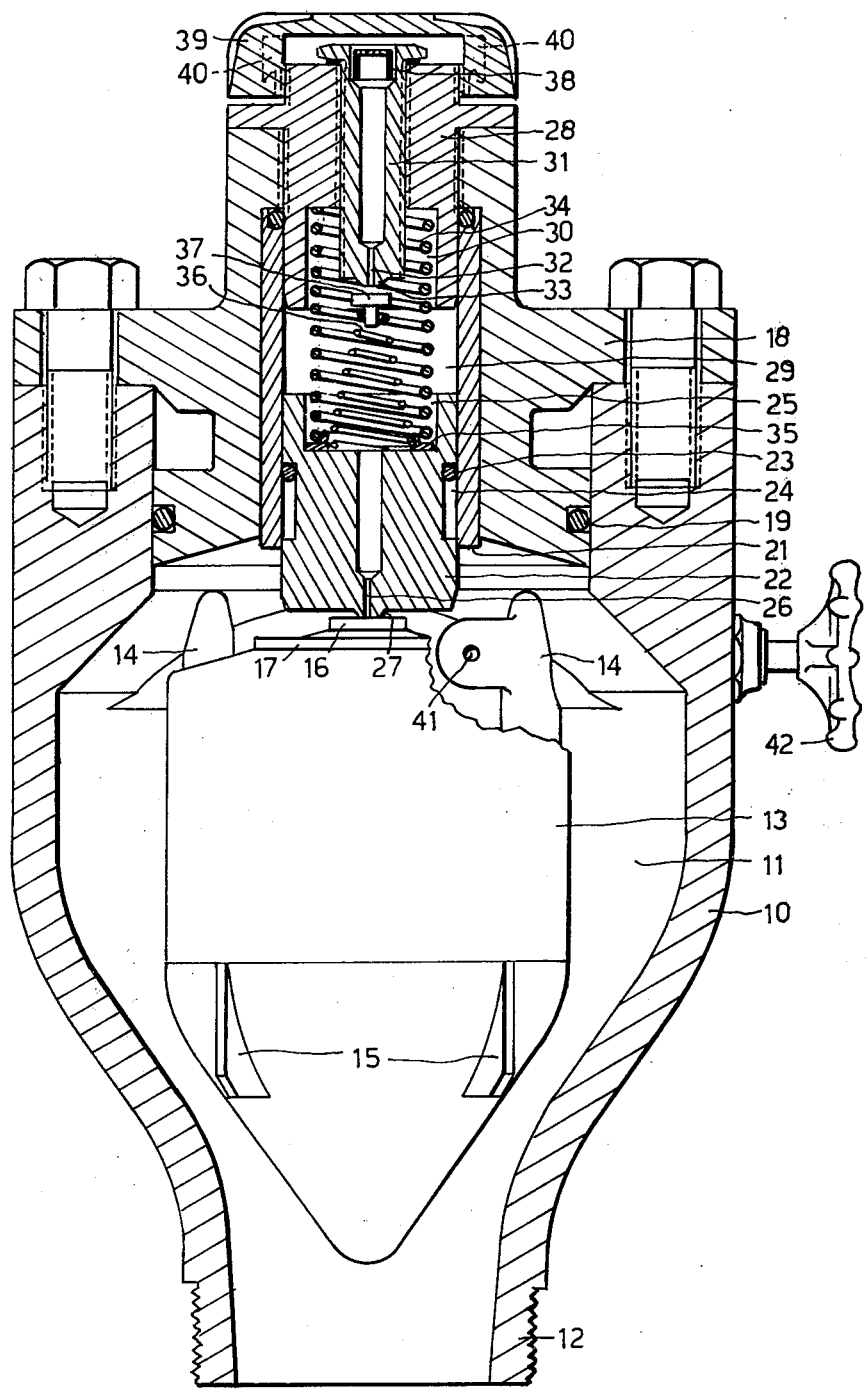

AIR RELEASE VALVE

BACKGROUND OF THE INVENTION

This invention relates to an air-release valve, of the type which is commonly used in a system containing liquid with gas above it. A common use of such a valve is for the release of gases from sewage systems during flow conditions, as distinct from the conditions which obtain during the charging and discharging of a pipeline or container.

Previously, a valve of this type has had a single orifice for the release of gas, the orifice being opened or closed either by a float, usually a rubber-covered sphere, or alternatively by a linkage mechanism interposed between the orifice and the float, and operated by the float.

A disadvantage of the former type of valve is that the level of liquid in relation to the ball is fairly high, with the result that the orifice may be fouled by the liquid or any floating debris in the pipeline. Also, when such a valve is closing during the charging of a pipeline or container, the high level of liquid relative to the ball may result in a quantity of the liquid being ejected from the valve orifice. In normal operation, the use of a fixed orifice results in the orifice seating bleeding continuously as the air and gases accumulate, and this continuous bleeding can erode and wear the orifice and the surface of the ball or float.

In the latter type of valve mentioned, the linkage mechanism is likely to become fouled by the liquid or floating debris, causing malfunction of the valve and the release of contained liquid. Also, such a linkage is liable to wear, reducing the efficiency of control and gas release.

In either form of air-release valve hitherto used, there is a likelihood of fumes and odours escaping from the pipeline when the line is draining or in a drained condition.

The present invention has been devised with the general object of overcoming the said present disadvantages by providing an air-release valve which will operate efficiently, is not liable to malfunction as a result of fouling from debris, and which is efficiently sealed when a pipeline or container is draining or in a drained condition.

SUMMARY OF THE INVENTION

The invention resides broadly in an air-release valve including a body; a float chamber in the body; a passage leading to the float chamber for connection to a pipeline or container; a float vertically movable in the float chamber; a top chamber in the body, a movable member vertically movable in the top chamber and adapted to be raised in the top chamber by the float rising in the float chamber or by gas pressure in the float chamber; a primary air release orifice through the said movable member from the float chamber to the top chamber; a secondary air release orifice from the top chamber to atmosphere, first sealing means connected to the float and adapted, when the float rises in the float chamber, to close the said primary orifice; and secondary sealing means conected to the said movable member and adapted when the said movable member is moved upwardly in the top chamber to close the said secondary orifice. Other features of the invention will become apparent from the following description.

BRIEF DESCRIPTION OF THE DRAWING

The accompanying drawing is a sectional view of an air-release valve according to a preferred embodiment of the invention.

DESCRIPTION OF THE PREFERRED EMBODIMENT

The valve illustrated includes a body 10 within which is a float chamber 11. The body tapers at the bottom to an inlet 12 which is externally threaded for connection to a sewerage main (not shown).

A float 13, weighted at the bottom, is freely movable vertically in the float chamber 11, and within guides 14 extending inwardly from the float chamber wall. The downwardly tapered bottom part of the float is formed with projections 15 which support the float in its lowermost position, as shown, resting against the tapered lower part of the valve chamber and ensuring that the inlet 12 is not closed by the float.

On top of the float there is secured a central resilient disc-shaped float seal pad 16, and, at a lower level, a concentric resilient float seal ring 17.

A bonnet 18 is bolted on top of the valve body 10 and is sealed by an O-ring 19. The bonnet is formed with an axial passage of which the upper part is tapped. A cylindrical liner 20 is secured in the main lower part of the axial passage, its lower end extending below the bottom of the passage to form an annular seating 21.

A piston 22 is slidable in the liner 20, and is sealed by an O-ring 23 in an annular groove 24 about the piston. A recess 25 is formed in the top of the piston, and below this recess an axial aperture is formed through the piston, its reduced-diameter lower part constituting the primary orifice 26 of the valve. About the bottom end of this primary orifice, the piston is shaped to form an annular seating 27.

A valve top 28 is screwed into the tapped upper part of the axial aperture of the bonnet 18, and the space enclosed within the liner 20, between the piston 22 and the valve top 28 constitutes a top chamber 29. The tope 28 has a recess 30 formed in its lower end, and has a tapped axial aperture into which there is screwed a threaded orifice plug 31 with an axial passage, the lower reduced-diameter part of which constitutes a secondary orifice 32. The bottom of the plug 31 is shaped to form an annular seating 33 about the lower end of the secondary orifice 32.

The piston 22 is urged downwardly by a helical compression primary spring 34, its upper end seated in the recess 30 of the valve top 28, its lower end on a spring retainer 35 in the recess 25 of the piston. A secondary spring 36, which is a coned helical spring which oerates in both the tension and compression regions during the operation of the valve, is seated on the top of the piston 22, located coaxially within the primary spring 34, and has fixed to its upper end a secondary orifice seal pad 37. In order to provide the necessary tension in the spring 36, it will be understood that the spring is connected at the top thereof to the pad 37 and at the bottom thereof, directly or indirectly, to the top of the piston 22.

A self-cleaning perforated air vent fitting 38, serving also as a frame trap, is provided in the enlarged-diameter upper end of the axial aperture of the orifice plug 31, and a cap 39 with gas outlet passages 40 is screwed onto the threaded upper end of the valve top 28.

The valve is not designed to vent large amounts of gas during the pipeline charging operations, but it will vent some of the gas in the line. As charging commences, the gas pressure in the line, and therefore in the float chamber 11, is increased, and acts on the bottom face of the piston 22 to force the piston upwards, compressing the primary spring 34 and, in lifting the seating 27 from the seal pad 16, opening the primary orifice 26, so that gas escapes into the top chamber 20. If the movement has been small, the gases in the top chamber 29 will then pass through the secondary orifice 32, the axial passage of the orifice plug 31, and the gas outlet passages 40 of the cap 39. If the pressure rise has been rapid and the piston 22 has moved to the extent of lifting the seal pad 37 to close the secondary orifice 32, the pressures in the top chamber 29 and the float chamber 11 will equalize, and the primary spring 34 will move the piston 22 down, reopening the secondary orifice 32. The valve will then vent the gases continuously in this equilibrium position. The piston will be restrained against vibration due to the damping effect of the O-ring 23.

When the piston 22 is moved down by the primary spring 34, the pressure in the top chamber 29 initially holds the seal pad 37 on the secondary orifice 32, until the tension of the secondary spring 36 is sufficient to snap the seal pad 37 down to open position.

When liquid level is rising during charging, then assuming the float 13 and the piston 22 to be initially in the equilibrium position described above, when the liquid enters the float chamber 11, the float 13 will rise and seal the primary orifice 26 with its central float pad 16. The gas pressure within the pipeline and the float chamber acting on the bottom of the piston 22, and the force exerted by the rising float 13, will move the piston and the float to top positions, the primary spring 34 being compressed, the seal pad 37 being brought up to close the secondary orifice 32, the secondary spring 36 also being compressed. The top chamber 29 is then completely sealed. As the gases are captured by the valve and held in the float chamber 11, the level of liquid is this chamber is forced down, so the float drops to open the primary orifice 26 and permit gas to enter the top chamber 29. The gas pressure above and below the piston 22 then being in near equilibrium, the primary spring 34 forces the piston 22 down. Simultaneously the liquid level in the float chamber 11 rises, so the float is again lifted to close the primary orifice 26 with its central seal pad 16. This operation is repeated, the piston 22 being lowered each time until the secondary orifice 32 is opened to release the accumulated gases to atmosphere. This release of pressure from the top chamber 29 removes the equilibrium of pressure across the piston 22, causing the gas pressure in the float chamber to move the piston 22 up assisting in the venting operation. The cycle as above described will then be repeated to the extent required to discharge the accumulated gases in the float chamber.

The normal operation of the valve, otherwise than when the pipeline is being charged or drained, is as above described.

During draining of the pipeline, the gas pressure in the pipeline and in the float chamber 11 is reduced, and the entrapped gases expand, lowering the liquid level, and the valve will exhaust to atmosphere as before described. With the gases fully exhausted, the top chamber 29 will be vented to atmosphere, and the piston 22 will be in bottom position, as shown in the drawing, with the primary orifice 26 closed against the float's central seal pad 16. If the pressure in the pipeline and float chamber is reduced further, the piston 22 will remain held against the float and effectively seal the pipeline. This sealing removes the problem of odours that can be released from the pipeline while under maintenance. Also, if the external pressure surrounding the valve should be increased, as may occur during flooding, the valve seals the contents of the pipeline and prevents contamination of the contents of the pipeline or of the environment.

The valve is such that normal maintenance can be carried out without the necessity to depressurize the pipeline, or to operate an isolating valve or the like. The valve is dismantled by removing the cap 39, then the orifice plug 31. As this is removed, the top chamber 29 is depressurized, and the piston 22 is lifted to full extent when it is brought against the bottom of the valve top 28. The valve top 28 is then unscrewed, and the float 13 is consequently permitted to rise so that its seal ring 17 is brought against the fixed protruding bottom end or seating 21 of the liner 20, the seal between the float and liner being thus completed before the top 28 has been completely disengaged from the bonnet 18. The removal of the valve top 28 gives full access to all the mechanisms of the valve, allowing replacement as required. For re-assembly, the orifice plug 31 is engaged in the valve top 28 before the valve top is screwed into the bonnet 18. As the valve top 28 is being screwed into place, the seal pad closes the secondary orifice 32, and at the same time the float's seal ring 17 remains firmly against the seating 21 about the bottom of the liner 20, so there is a sealed chamber between the bottom of the valve top 28 and the top of the float 13. As the vlave top is further screwed into place, the pressure rises in this sealed chamber, relieving the high contact pressure on the primary orifice 26 by the float's central seal pad 16 as the seal between the liner 20 and the float seal ring 17 is released. When the top 28 has been fully screwed into place, the cap 39 is refitted.

So that preventive maintenance may be carried out, the valve may be provided with a back-wash system. A nozzle 41 leads into the upper part of the float chamber, and may be connected by suitable passages formed in the valve body 10 to a source of water under pressure, the flow of which through the nozzle is controlled by a handle 42 which is rotatable to open or close a simple valve (not shown). When this valve is opened by means of the handle 42, a jet of water under pressure is directed through the nozzle 41 to clean away any accumulation of debris, particularly from the top of the float 13 and from the seal pad 16, seal ring 17 and bottom of the primary orifice 26.

We claim:
1. An air release valve including:
   a body,
   a float chamber in the body,
   a passage to the float chamber for connection to a pipe liner or container,
   a float vertically movable in the float chamber,
   a top chamber in the body,
   a movable member in the form of a piston vertically movable in the top chamber and adapted to be raised in the top chamber by the float rising in the float chamber or by gas pressure in the float chamber, and first resilient means for biasing said piston downwardly, a primary air release orifice through said piston from the float chamber to the top chamber, a secondary air release orifice from the top chamber to atmosphere, said primary and secondary air release orifices being in series flow arrangement, first sealing means connected to the float and adapted, when the float rises in the float chamber, to close said primary orifice, and second sealing means in the form of a sealing pad connected to said piston by second resilient means and adapted when said piston is moved upwardly in the top chamber to close the said secondary orifice, whereby said piston can exert a force either in a closing or opening position.

2. An air-release valve according to claim 1 wherein:

a third sealing means is mounted on the float and is adapted, when the float is in fully raised position in the float chamber, to seal the top chamber from the float chamber.

3. An air-release valve according to claim 1 having back-washing means including:

a nozzle directed into the upper part of the float chamber, means for connecting the nozzle to a source of water under pressure, and means for controlling the flow of water through the nozzle and into the upper part of the float chamber.

4. The air release valve according to claim 1 wherein said first sealing means comprises a sealing pad secured on the top of the float.

* * * * *